No. 806,764. PATENTED DEC. 12, 1905.
C. G. ASHBY & J. F. MacINDOE.
REVERSIBLE ROTARY TURBINE ENGINE.
APPLICATION FILED FEB. 13, 1905.

6 SHEETS—SHEET 1.

Witnesses
M. D. Blondel
E. B. McBath

Inventors
C. G. Ashby.
J. F. MacIndoe.
By
O'Meara & Noels,
Attorneys

No. 806,764. PATENTED DEC. 12, 1905.
C. G. ASHBY & J. F. MacINDOE.
REVERSIBLE ROTARY TURBINE ENGINE.
APPLICATION FILED FEB. 13, 1905.
6 SHEETS—SHEET 2.
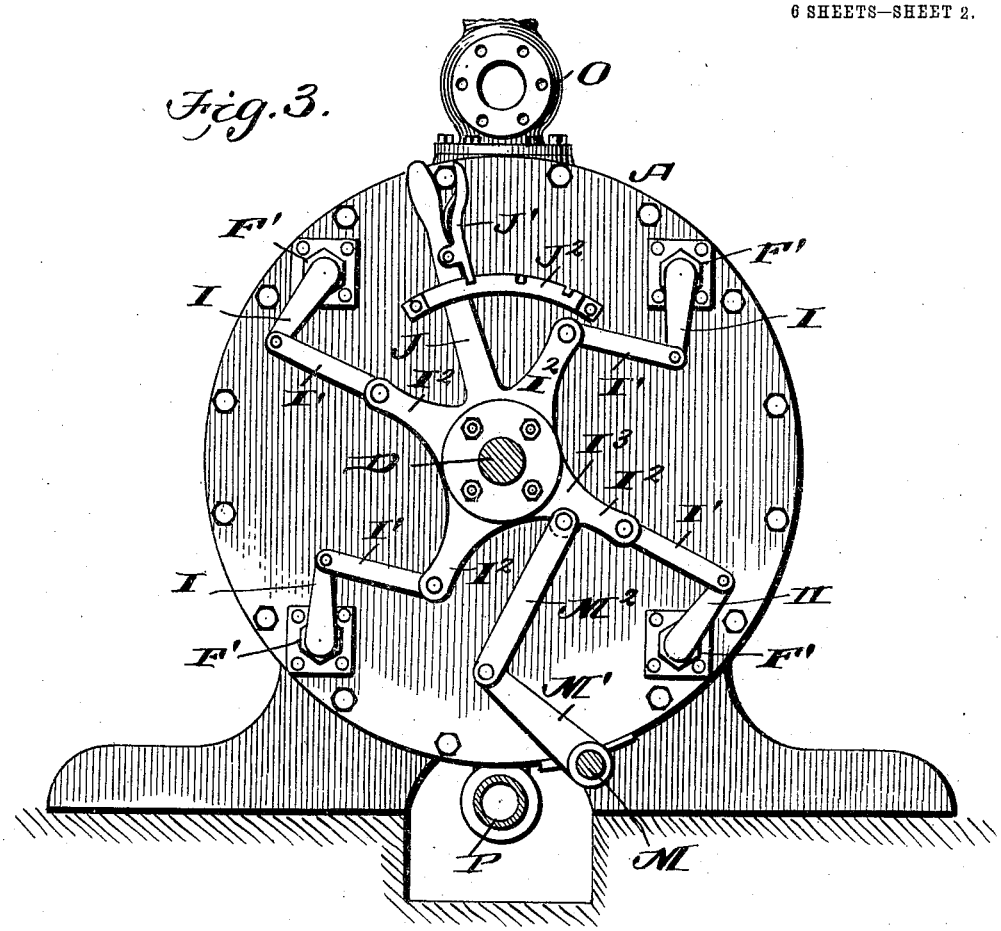
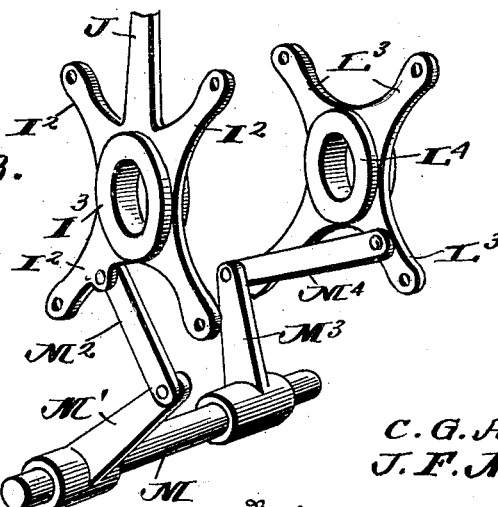

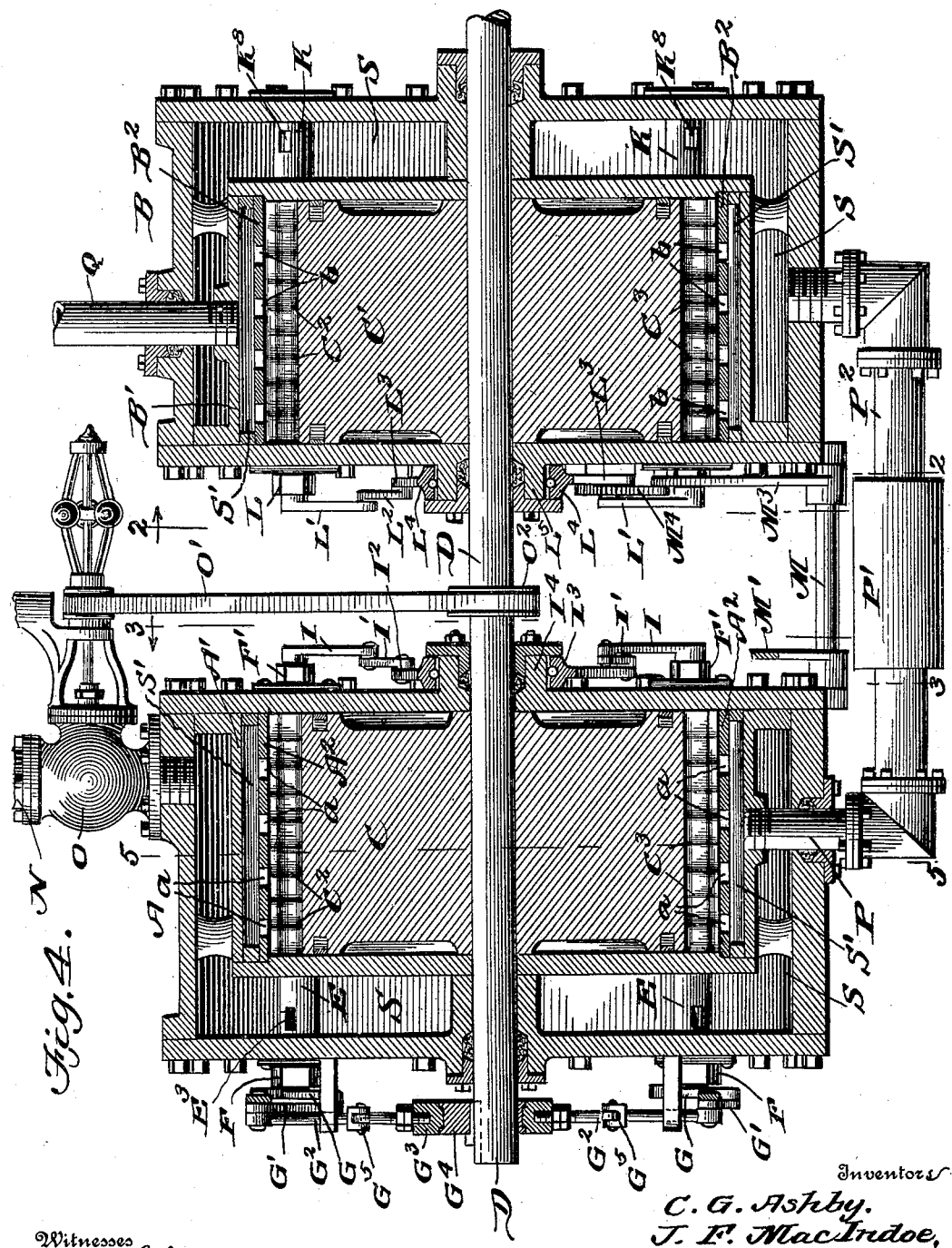

No. 806,764. PATENTED DEC. 12, 1905.
C. G. ASHBY & J. F. MacINDOE.
REVERSIBLE ROTARY TURBINE ENGINE.
APPLICATION FILED FEB. 13, 1905.
6 SHEETS—SHEET 4.
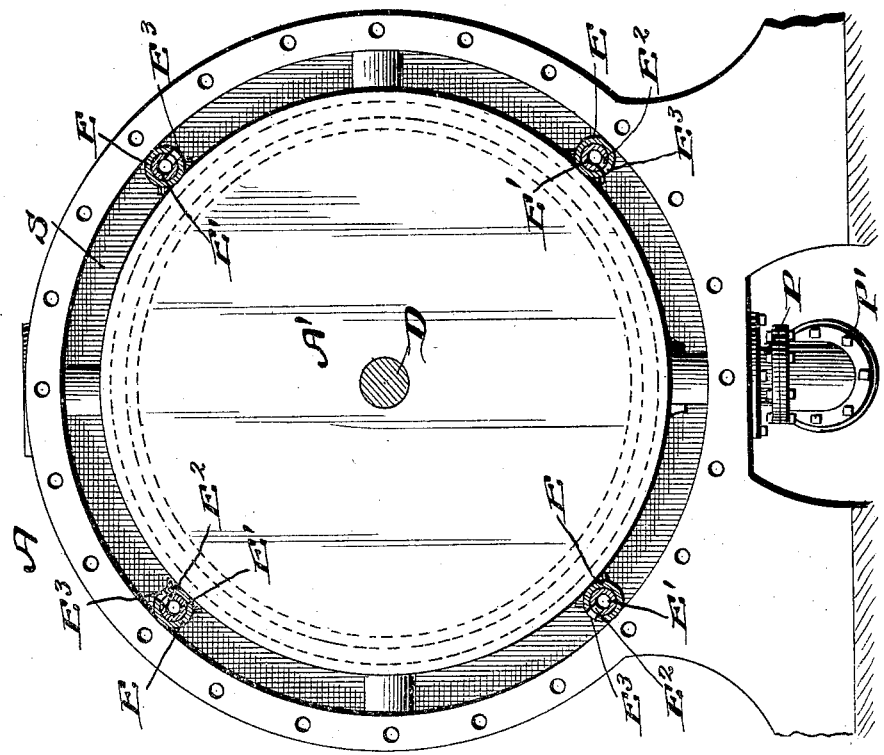
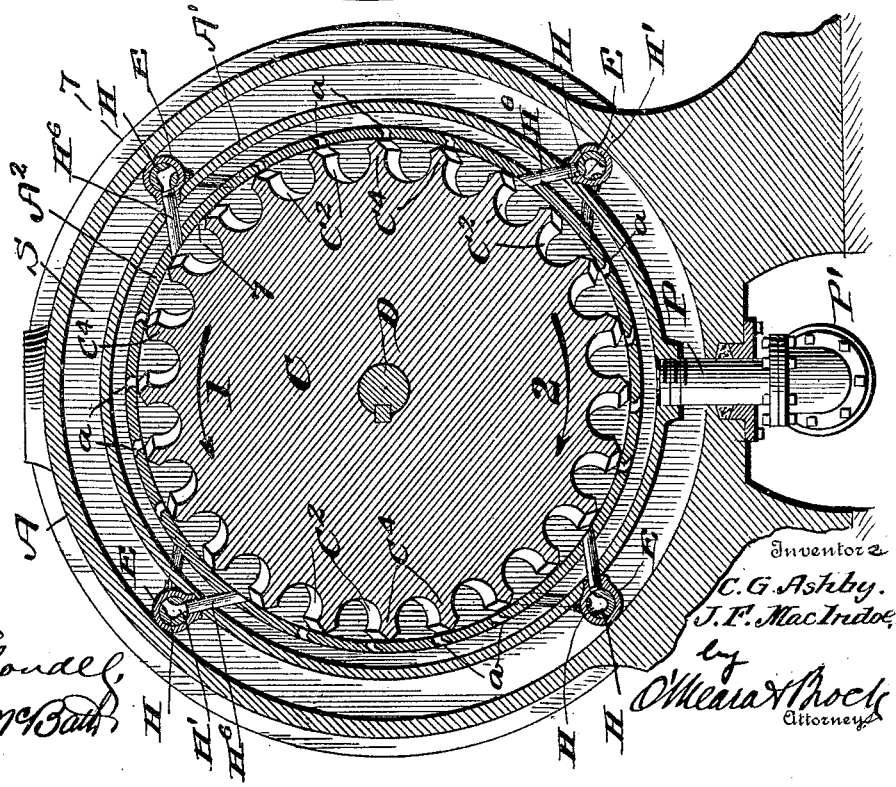
Witnesses
Inventors
C. G. Ashby.
J. F. MacIndoe.
Attorneys

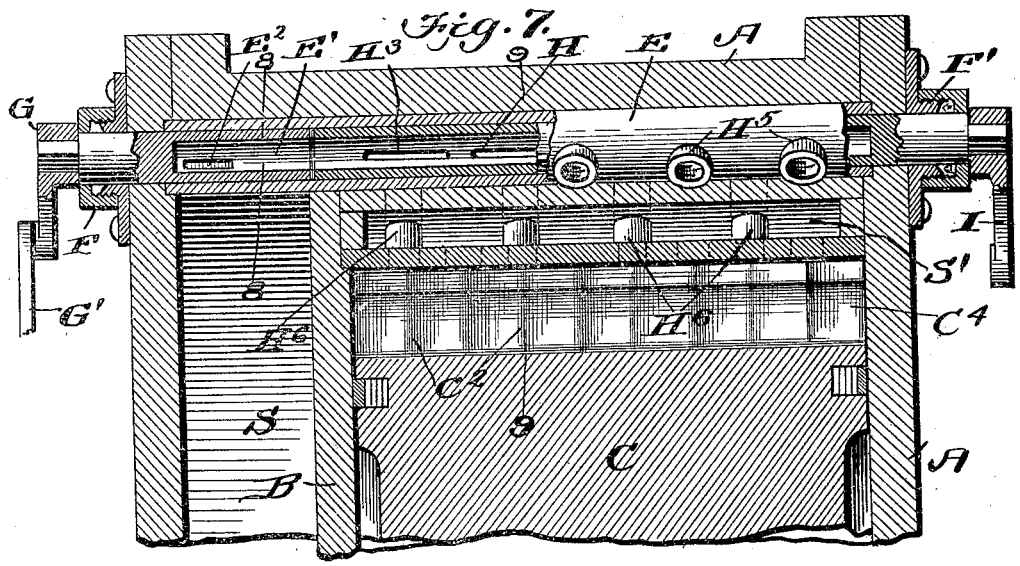
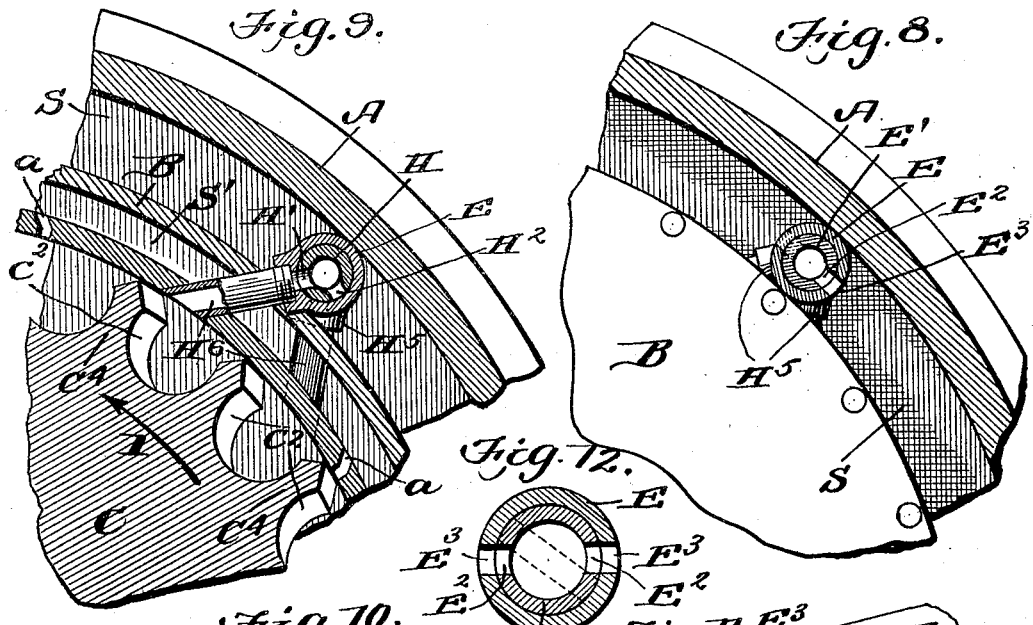
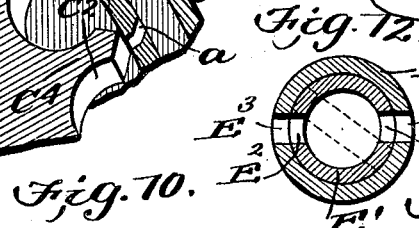
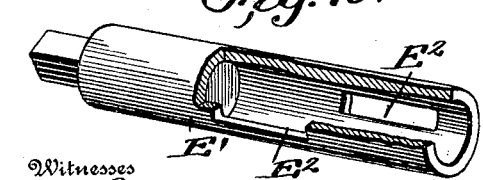

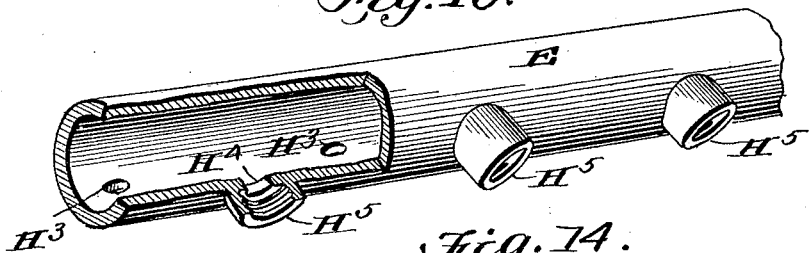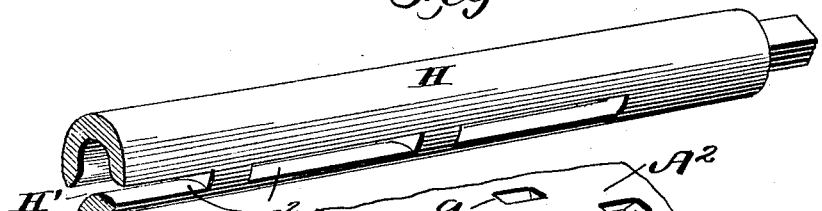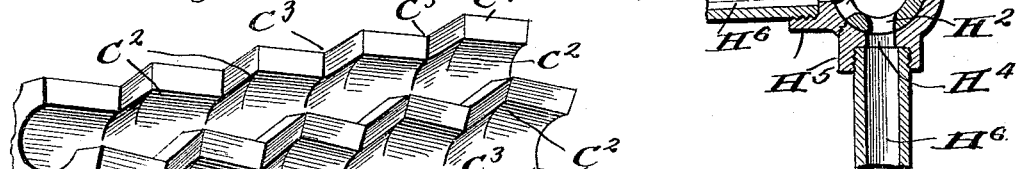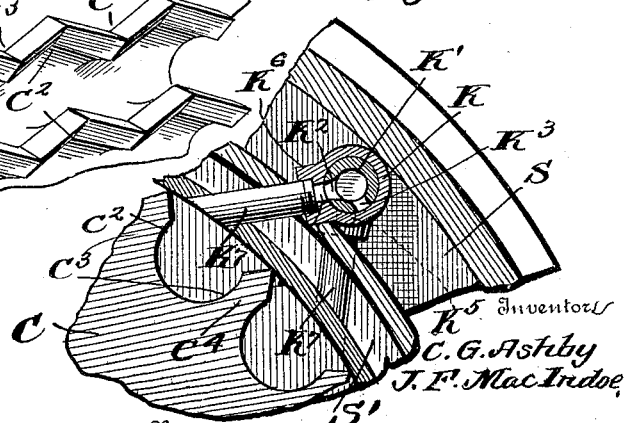

UNITED STATES PATENT OFFICE.

CHARLES GEORGE ASHBY, OF CAMDEN, NEW JERSEY, AND JOHN FRANKLIN MacINDOE, OF PHILADELPHIA, PENNSYLVANIA.

REVERSIBLE ROTARY TURBINE-ENGINE.

No. 806,764.          Specification of Letters Patent.          Patented Dec. 12, 1905.

Application filed February 13, 1905. Serial No. 245,469.

*To all whom it may concern:*

Be it known that we, CHARLES GEORGE ASHBY, residing at Camden, in the county of Camden and State of New Jersey, and JOHN FRANKLIN MacINDOE, residing at Philadelphia, in the county of Philadelphia and State of Pennsylvania, citizens of the United States, have invented a new and useful Improvement in Reversible Rotary Turbine - Engines, of which the following is a specification.

This invention relates to an improvement in compound turbine-engines, and particularly to the rotary type, the object being to provide an engine particularly adapted for marine uses, one in which great power and speed may be obtained with a minimum amount of steam-pressure, and one capable of easy and positive reversibility, which is absolutely essential to engines used for this purpose.

A further object is to provide a construction in which the expanded steam is utilized after being first used; and a still further object is to provide for an intermittent feed of the steam to the turbine-wheels and also means for automatically controlling this feed.

The invention still further comprises certain details of construction and novelties of combination and arrangement of parts, as will be fully described in the following specification and pointed out in the claims, reference being had to the drawings, in which—

Figure 1:
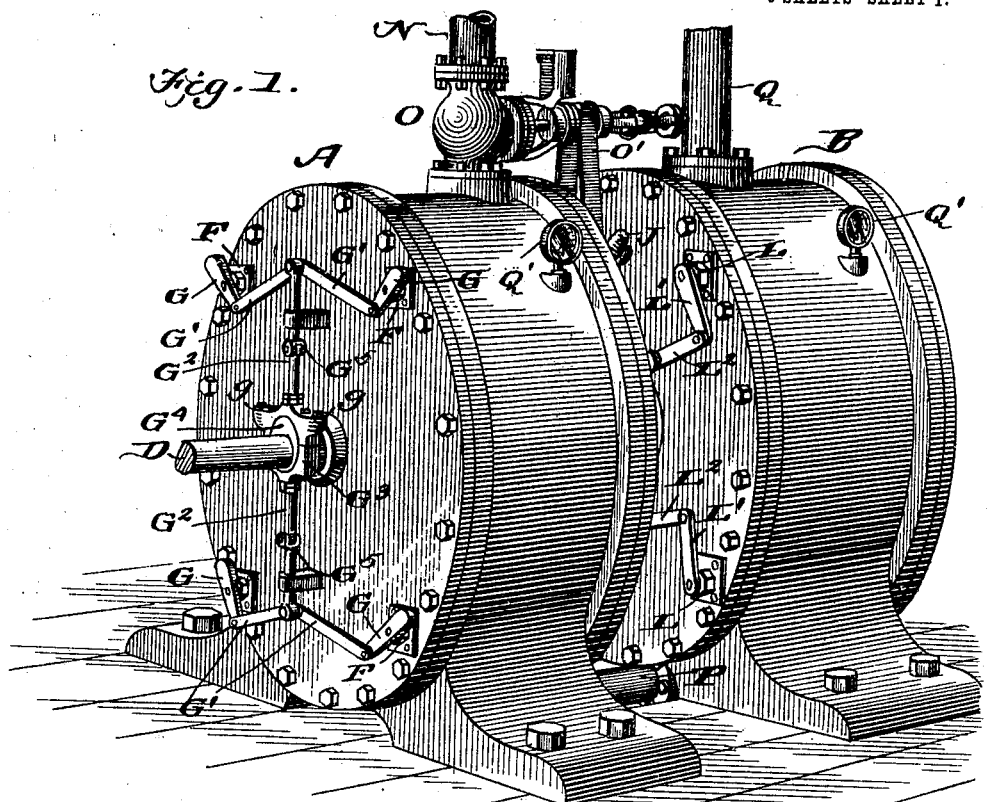
Figure 2:
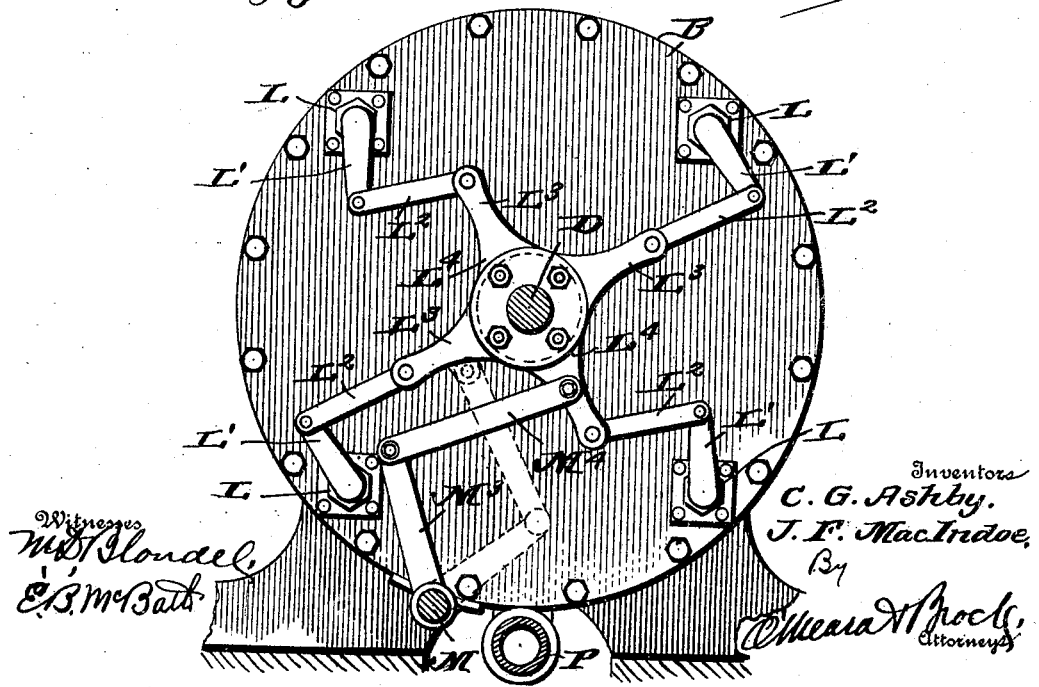

Figure 1 is a perspective view of an engine constructed in accordance with our invention. Fig. 2 is a transverse sectional view drawn on the line 2 2 of Fig. 4. Fig. 3 is a similar view drawn on the line 3 3 of Fig. 4. Fig. 4 is a longitudinal sectional view of our engine. Fig. 5 is a transverse section drawn on the line 5 5 of Fig. 4. Fig. 6 is an end view of one of the casings with the end plate or head removed and certain parts shown in section. Fig. 7 is an enlarged detail sectional view drawn about on the line 7 7 of Fig. 5. Figs. 8 and 9 are detail sections drawn on the lines 8 8 and 9 9, respectively, of Fig. 7. Figs. 10 and 11 are detail perspective views of the cut-off valve and its casing, respectively; and Fig. 12 is an enlarged detail sectional view drawn through the valve and its casing and showing in dotted lines the cut-off movement of the valve. Fig. 13 is a detail perspective view of the portion of the valve-casing in which is held the reversing-valve, and Fig. 14 is a detail perspective view of the reversing-valve. Fig. 15 is an enlarged sectional view of the reversing-valve and casing. Fig. 16 is a detail perspective view of a portion of the turbine-wheel. Fig. 17 is a detail sectional view drawn through the reversing-valve arranged in the secondary casing, and Fig. 18 is a detail perspective view of the disks carrying the arms and lever for operating the valves in the secondary casing when those of the primary casing are operated. Fig. 19 is a detail of construction.

It may be well to say that in constructing our engine we have ever had in mind the arrangement in which strength and durability are maintained and in which very few parts are employed, which lessens the liability of accidents, common in engines of this class, and which is a serious objection, as they often get out of order when least expected and often at the most inopportune times.

In constructing an engine in accordance with our invention we employ two casings which practically form steam-boxes and which are designated as a whole by the reference characters A and B, in each of which is arranged a cylinder $A'$ and $B'$, respectively, and within these cylinders are arranged cylinders $A^2$ and $B^2$, all being tightly united to the casings to form steam-tight joints. The space between the casings and the cylinders $A'$ and $B'$ forms steam-chambers S, and the spaces between the cylinders $A'$ and $A^2$ and $B'$ and $B^2$ form exhaust-chambers $S'$, as will be clearly described later on. Working within the cylinders $A^2$ and $B^2$ are the turbine-wheels C and $C'$, each being mounted upon a common shaft D, which extends through both casings and is the driven shaft through which power is imparted for driving machinery of any character. The cylinders $A'$ and $B'$ are similar in construction and somewhat smaller than the casings, so that the steam-spaces S are provided at one end of each cylinder and also around their entire peripheries, while the cylinders $A^2$ and $B^2$ are smaller in diameter than the cylinders $A'$ and $B'$ and snugly fit the sides of the latter to provide the annular exhaust-chambers $S'$, which communicate with the interior of the cylinders $A^2$ and $B^2$ through suitable ports $a$ and $b$, respectively.

Arranged at regular intervals within the steam-space S of the casing A are the valve casings or cylinders E, in each of which and at one end is arranged a short cylindrical cut-off valve $E'$, having ports $E^2$ registering with inlet-ports $E^3$, formed in the valve casings or cylinders, the outer ends of these valves being projected through suitable openings in one of the heads of the casing and also through suitable stuffing-boxes F, surrounding the said openings, the outer ends or stems of the valves being reduced and made non-circular, over which fit weighted crank-arms G, to one end of each of which is connected a link $G'$, whose opposite ends are connected to vertically-reciprocating rods $G^2$, carried by an eccentric-strap $G^3$, which works upon an eccentric $G^4$, carried by the shaft D, and interposed in each rod is a knuckle-joint $G^5$ to permit any slight lateral movement which may be caused by the eccentric during its revolution. These rods $G^2$ project from diametrically opposite points of the strap, as most clearly shown in Fig. 1 of the drawings, and in practice we propose to provide oil-cups $g$ in the straps, from which extend openings which extend through the strap to lubricate the contacting surfaces of the strap and eccentric. As shown in the drawings, the inner ends of the cylindrical cut-off valves abut against the inner ends of hollow cylindrical reversing-valves H, each valve having ports $H'$ and $H^2$, which communicate with sets of outlet-ports $H^3$ and $H^4$, formed in each of the valve casings or cylinders and upon opposite sides thereof, and surrounding these ports $H^3$ and $H^4$ are the threaded nipples $H^5$, in each of which is screwed discharge or feed nozzles $H^6$, which extend in diverging directions through the periphery of the cylinder $A'$ and also through the periphery of the cylinder $A^2$ and as near tangential to the peripheries of the cylinders as is possible to have them. These nozzles are arranged to discharge into a plurality of series of alternating pockets $C^2$ and $C^3$, formed in the turbine-wheel, upon opposite sides of ribs $C^4$, projecting from the periphery of the cylinder, and to provide the alternating pockets, as before stated, the ribs $C^4$ are arranged in serpentine form across the periphery of the cylinder, which provide alternating concave pockets, as will be more fully described later on. Of course it will be understood that the discharge through either set of nozzles is controlled by the reversing-valves, and in order to provide for the control of these valves their stems are projected through openings formed in the head of the casing opposite that through which the cut-off valve projects, and each of these openings is also surrounded by a stuffing-box $F'$, similar in construction to the stuffing-boxes F. The stems of these valves H are of course closed and made non-circular and upon which are fitted one end of the crank-arms I, to the opposite end of each of which is connected a link $I'$, having their opposite ends connected to arms $I^2$, formed integral with and projecting from a disk $I^3$, mounted upon a hub $I^4$, formed upon the head of the casing and through which the shaft D passes. In practice we propose to interpose antifriction-balls between the disk and hub to reduce friction and render the disk as easily operated as possible. Suitable stuffing-boxes are also employed to surround the shaft adjacent the hub. Extending from the disk $I^3$ is a controlling-lever J, carrying a ratchet-lever $J'$, which works upon a segment $J^2$, fixed upon the head of the casing, and by which the disk is positively held in its adjusted position and of course through the medium of the links and arms holding the valves firmly in position.

As before stated, the steam and exhaust spaces S and $S'$ are also provided in the casing B, and within the steam-space S are the cylindrical valve-casings K, similar to the valve-casings E; but in order to differentiate casings K from the casings E we shall hereinafter speak of them as "valve-tubes," but in realty they are of the exact construction and could be interposed without causing the slightest confusion. Within the valve-tubes K are arranged tubular valves $K'$, having ports $K^2$ and $K^3$, which register with sets of outlet-ports $K^4$ and $K^5$, formed in the valve-tubes, and surrounding these latter ports are the threaded nipples $K^6$, in which are screwed the discharge or feed nozzles $K^7$, which extend divergingly through the periphery of the cylinders $B'$ and $B^2$ to discharge into either set of pockets $C^2$ or $C^3$, formed in the periphery of the turbine $C'$. These discharge or feed nozzles $K^7$ also tangentially project through the periphery of the cylinder similar to the tubes $H^6$, so as to discharge into the pockets and upon the sides of the same of the turbine $C'$. The valves $K'$, however, do not extend throughout the entire length of the tubes K, but stop short of one end thereof, which ends are provided with inlet-ports $K^8$, through which steam passes to the valves, there being no valves in the tubes K to control the ports $K^8$, as in the casings E. The valves $K'$ have their outer ends closed and reduced to provide stems which project through openings in the end of the casing B and also through stuffing-boxes L, surrounding the openings, and to each stem is connected a crank-lever $L'$, each lever having its free end connected by links $L^2$, whose opposite ends are connected to arms $L^3$, projecting from a disk $L^4$, which is journaled upon a hub $L^5$, formed upon the end of the casing. In practice antifriction-balls are also interposed between this disk and hub similar to the disk and hub of the casing A, and it might be well to state here that we propose to utilize the glands of the stuffing-boxes to hold the disks upon the hubs.

The disks $I^3$ and $L^4$ are connected by means of crank-arms and links, so that the movement of one will affect the other, and when the disk $I^3$ is operated motion will also be imparted to the disk $L^4$, and to accomplish this we journal a rock-shaft M between and to the casings, and to one end of the shaft is connected a crank-arm M', which in turn is connected to a link M², whose opposite end is connected to one of the arms of the disk I³. Upon the opposite end of the shaft is arranged a second crank-arm M³, which extends at an obtuse angle from the shaft in relation to the arm M' and to the free end of which is connected a link M⁴, whose opposite end is connected to one of the arms of the disk L⁴. By this arrangement it will be readily seen that when the disk I³ is operated by the controlling-lever motion will be imparted to the disk L⁴, which through the links and crank-arms will operate the valves K' simultaneously with the valves H.

A steam-inlet pipe N is connected to the casing A, interposed, in which is a governor O of any suitable construction and operated by a belt O' and a pulley O², carried by the shaft D.

An exhaust-pipe P is connected to the cylinder A' and communicates with the exhaust-chamber and extends through the casing A to a separator P' of any suitable construction, and from which a pipe P² extends, which is connected to and communicates with the steam-space S of the casing B. A final exhaust-pipe Q is connected to the cylinder B' and communicates with the exhaust-chamber S' of the casing B and extends through the said casing B to any suitable point, as shown most clearly in Fig. 4 of the drawings. Suitable stuffing-boxes are employed for these pipes where they extend through the casings.

From the foregoing description, taken in connection with the drawings, it will be seen that we provide a main and auxiliary engine which are suitably connected to form practically one; but we desire it understood that the main engine may be operated independently from the auxiliary engine, and the latter may be entirely dispensed with, and in cases where the auxiliary is not employed the exhaust-pipe P will of course form the final exhaust, similar to the pipe Q.

In operation steam is admitted through the pipe N and governor O into the steam-space S in the casing A, from whence it enters the valve-casings E through the ports E³, through the ports E² in the cut-off valves, through the latter into the reversing-valves, thence through either set of ports H' or H² in the reversing-valves, out through the registering ports, which may be H³ or H⁴, in the valve-casings, and finally through either set of nozzles H⁶, registering with the open ports, into the pockets C² or C³ of the turbine-wheel C. Of course the escape of steam through the ports is controlled by the valves, and which in turn are controlled by the lever J, and from the drawings it will be seen that when the lever is adjusted so that the ports H' and E² communicate the steam will escape through them and strike against the pockets C² and revolve the turbine in the direction indicated by arrow 1. After the steam operates upon the turbine and has expanded so that it is no longer of service it is necessary to permit it to escape, and for that purpose we provide the cylinder A² with a series of exhaust-ports $a$, through which the expanded steam may escape into the exhaust-chamber S', and in order that ample time may be given the steam to expand we arrange the first set or series of exhaust-ports a distance away from the inlet-ports which is equal to or a little greater than the distance between the ribs forming the pockets, and as it would be impossible for all of the steam to escape through the first set of exhausts $a$ we provide the series of exhausts, so that by the time the pockets are brought around to receive the impact of steam from the next set of nozzles the old charge, or that received from the preceding set of nozzles, will have been entirely exhausted. Now should the lever be reversed, so that the ports H² and E³ communicate, the steam will escape through the opposite set of nozzles H⁶ and entering the pocket C³ will revolve the turbine in the opposite direction, or that indicated by the arrow 2 shown in Figs. 9 and 16 of the drawings, and the same arrangement of exhaust-ports is provided to permit the escape of the expanded steam from the pockets C³. It may be stated here that the discharge-mouth of the ports $a$ are arranged at an angle, so that the steam will be directed around the exhaust-chamber S', and thus preventing it striking directly opposite the inner wall of the cylinder B, which would reflect it and have a tendency to retard the escape. As heretofore described, the pockets are arranged in serpentine alinement, so that every other pocket will provide a recess to receive the escaping steam from one of the sets of nozzles to drive the turbine in one direction, while the space between these pockets and upon the opposite sides of the ribs C⁴ form the pockets C³ to receive the discharge of the steam as it escapes from the other set of nozzles. By this arrangement we provide the entire periphery of the turbine with pockets, and of course it may be understood that the outer edges of the pockets snugly fit within the cylinder A². The steam after operating upon the turbine C escapes through the ports $a$ into the exhaust-chamber S', from whence it escapes through the pipe P, separator P', and pipe P² into the steam-chamber S in the casing B', from whence it enters the valve-tubes K through the ports K⁸, and finally out through either set of ports K² or K³ and K⁴ or K⁵ and either set of nozzles K⁷ into the pockets C² or C³ and revolves the turbine C', and thus assists the turbine C in operating the shaft D. The same arrangement of exhausts are arranged in the cylinder B² as that previously described about the cylinder A². After the steam has operated upon the turbine C' it finally escapes through the exhaust-pipe Q. Assuming the turbines are being driven in the direction indicated by arrow 1, it will be readily understood that it is only necessary to throw the lever J to close the ports now open and open the ports now closed, when the steam will be directed through the opposite sets of nozzles and striking in the opposite pockets in the turbine the latter will be forced to revolve in the opposite direction, or in the direction indicated by the arrow 2.

We have found it an important feature to provide intermittent impacts of steam against the pockets of the turbine, and to accomplish this intermittent feed we arrange for the intermittent inlet into the valves by providing the valves E', which are operated to open and close the ports $E^3$ and which are operated through the medium of the eccentric and its connections to the valves and as indicated in Fig. 6 of the drawings, and we propose to have two sets of ports open while the remaining sets are closed, so that the turbine will have practically a constant impact of steam striking in the pockets.

Suitable gages Q' are arranged upon the casings.

For stationary uses we propose to employ an automatic shaft-governor which is suitably connected to the valves to intermittently open and close them, and thus control the feed of steam; but as this governor forms no part of our invention its illustration is thought unnecessary.

From the foregoing it will be readily apparent to those skilled in the art to which our invention appertains that we provide an exceedingly-efficient device by which very high speed and power may be obtained with a minimum amount of steam and, further, that by the arrangement of the exhausts the dead steam is immediately gotten out of the way, so that the action of the live steam will not be impaired. Furthermore, we may say that, if found desirable, we shall use the common form of expansion-nozzle in place of those with a straight bore, as shown in the drawings.

Having thus fully described our invention, what we claim as new, and desire to secure by Letters Patent, is—

1. In an engine of the kind described, the combination with a casing having a cylinder arranged therein, said cylinder being smaller than the casing whereby a steam-space is provided, a second cylinder arranged within the first-mentioned cylinder, said second-mentioned cylinder being smaller in diameter whereby an exhaust-chamber is provided, a turbine-wheel mounted to revolve within the second cylinder and having a series of pockets which register with exhaust-ports provided in the said second-mentioned cylinder during the revolution of the turbine, valve-cylinders arranged within the steam-space and having inlet and exhaust ports, nozzles for conducting steam from the exhaust-ports to the pockets of the turbine, valves for controlling the inlet-ports, means connected to the valves to intermittently open and close the said inlet-ports and valves for controlling the exhaust-ports.

2. In a device of the kind described, the combination with a casing having a cylinder arranged therein to provide a steam-chamber within the casing, a second cylinder arranged within the first-mentioned cylinder to provide an exhaust-chamber between the cylinders, a turbine-wheel operating within the second cylinder and having a series of ribs projecting from its periphery which are arranged in serpentine alinement across the periphery thereof, whereby a plurality of series of alternating pockets are produced, nozzles communicating with the steam-chamber for conducting steam into the pockets, means for controlling the supply of steam into the pockets, the said second cylinder having a series of exhaust-ports, an inlet-pipe connected to the casing and an exhaust-pipe connected to the inner cylinder and communicating with the exhaust-chamber.

3. In a device of the kind described, the combination with a casing having a steam and exhaust chamber, of a turbine-wheel operating within the casing and having a series of alternating pockets in its periphery, the sides of the ribs forming said pockets being concaved, nozzles for conducting steam to the pockets, cylinders connected to the nozzles and having ports which communicate therewith, valves controlling the ports, and means for operating the valves.

4. In a reversible rotary turbine-engine, the combination with a rotary turbine-wheel, having a plurality of series of alternating concaved pockets in its periphery, of a cylinder surrounding the wheel and having a series of alternating ports which communicate with the pockets of the wheel when the latter is revolved, sets of steam-feeding nozzles for conducting steam to both sets of pockets, and means for controlling the entrance to either set of pockets.

5. In a reversible rotary turbine-engine, the combination with a turbine-wheel having a plurality of series of alternating pockets, each series of which being communicating, the ribs forming the pockets being arranged in serpentine form across the peripheries of the cylinder, whereby the alternating pockets are produced, a cylinder within which the wheel is mounted, said cylinder having ports which communicate with each series of pockets as the turbine revolves, cylinders having nozzles connected thereto for conducting steam to the pockets, the said nozzles extending in opposite directions from the cylinders, valves within the cylinders for controlling the entrances to the nozzles, and means for controlling the valves.

6. In a reversible rotary engine of the kind described, the combination with a turbine-wheel having a plurality of series of alternating pockets, of a cylinder within which the wheel is mounted, said cylinder having a series of ports communicating with the pockets, nozzles projecting through the said cylinder and substantially tangential to the peripheries thereof, the first set of ports in cylinder being arranged somewhat in advance of the nozzles, cylinders having ports with which the nozzles communicate, and also inlet-ports through which steam is fed to the nozzles, valves for intermittently opening and closing the inlet-ports, and valves for controlling the ports which communicate with the nozzles, substantially as specified.

7. In an engine of the kind described, the combination with a casing of a cylinder arranged therein, said cylinder being smaller in diameter than the casing whereby a steam-chamber is formed within the casing, a second cylinder arranged within the first-mentioned cylinder whereby an exhaust-chamber is formed between the said cylinders, a turbine-wheel mounted within the inner cylinder, valve-cylinders arranged within the steam-chamber, said valve-cylinders having inlet and exhaust ports therein, sets of discharge-nozzles extending in opposite directions from the valve-cylinders and projected through openings formed in the periphery of the turbine-cylinder to discharge into alternating pockets formed in the said turbine, valves arranged within one end of the valve-cylinders for controlling the inlet-ports, reversing-valves arranged in the valve-cylinders for controlling the exhaust-ports and means for independently operating said valves as specified.

8. In an engine of the kind described, the combination with the casing of a cylinder arranged therein, a shaft operating through the casing and cylinder, a turbine-wheel mounted upon the shaft within the cylinder, and having pockets arranged in its periphery, valve-cylinders arranged within the casing and having inlet and exhaust ports, sets of discharge-nozzles connected to the said valve-cylinder and extending in opposite diverging direction into the cylinder surrounding the turbine, valves operating in one end of the valve-cylinders and controlling the inlet-ports, the ends of the valves projecting through the casing, and having weighted crank-arms connected thereto, links connected to one end of the crank-arms and having their opposite ends connected to rods, the opposite ends of which are connected to an eccentric-strap carried by an eccentric disk mounted upon the shaft, reversing-valves operating in the remaining portions of the valve-cylinders and having ports to register with the exhaust-ports of the said valve-cylinders, one end of the reversing-valves projecting through the casing and having crank-arms connected thereto, a disk mounted upon the head of the casing and having arms radiating therefrom, links connecting the said arms and crank-arms, and a lever connected to the disk and operating upon a segment for holding the lever in position as specified.

9. In an engine of the kind described, the combination with a casing, of a cylinder arranged therein, said cylinder being of a smaller diameter than the casing whereby a steam-chamber is provided within the casing, a second cylinder arranged within the first-mentioned cylinder, a turbine-wheel mounted within the second-mentioned cylinder, valve-cylinders arranged within the steam-chamber and having inlet and exhaust ports, the inlet-ports communicating with the steam-chamber, sets of discharge-nozzles connected to the valve-cylinders and communicating with the exhaust-ports and extending into the turbine-cylinder in opposite diverging direction to discharge upon the sides of the pockets formed in the wheel, cut-off valves controlling the inlet-ports, reversing-valves controlling the exhaust-ports, and means for operating the cut-off valves and means for controlling the reversing-valves.

10. In an engine of the kind described, the combination with a casing, of a cylinder arranged therein, a turbine-wheel operating within the cylinder and having pockets in the periphery thereof, valve-cylinders arranged within the casing and having inlet and exhaust ports, sets of discharge-nozzles connected to the valve-cylinders and communicating with the exhaust-ports, said nozzles extending into the cylinder surrounding the turbine to discharge into pockets and upon the sides thereof formed in the periphery of the turbine-wheel, cut-off valves arranged in one end of the valve-cylinders and having ports which register with the inlet-ports, reversing-valves also arranged within the cylinders and having ports which register with the exhaust-ports, means for operating the cut-off valves to momentarily open and close the inlet-ports, and means for controlling the reversing-valves to open and close each set of ports.

11. In an engine of the kind described, the combination with a casing, of a cylinder arranged therein, a turbine-wheel mounted to revolve within the cylinder, said turbine-wheel having a series of pockets in its periphery, the ribs forming the pockets being in serpentine form across the periphery of the wheel, whereby a plurality of series of alternating pockets are produced, valve-cylinders arranged within the casing and having inlet and exhaust ports upon opposite sides thereof, sets of discharge-nozzles connected to the valve-cylinders and extending in diverging direction to the turbine to discharge into and upon the sides of the pockets thereof, reversing-valves controlling the discharge through the exhaust-ports, cut-off valves for intermittently closing the inlet-ports, and means for independently operating both sets of valves.

12. In an engine of the kind described, the combination with a casing, of a cylinder arranged therein, and having a series of exhaust-ports in its periphery, a turbine-wheel mounted to revolve within the cylinder, valve-cylinders arranged within the casing and having inlet and exhaust ports, the said exhaust-ports being upon opposite sides of the cylinders, discharge-nozzles connected to the valve-cylinders and extending in diverging directions into the turbine-cylinder to discharge into pockets formed in the periphery of the turbine-wheel, reversing-valves for closing the exhaust-ports upon either side of the valve-cylinders, means for operating the valves, cut-off valves arranged in the cylinders and controlling the inlet-ports, means connected to the cut-off valves for operating them to intermittently open and close the said inlet-ports.

13. In an engine of the kind described, the combination with a casing, of a cylinder arranged therein, said cylinder being of a smaller diameter than the casing whereby an annular steam-chamber is provided within the casing, a second cylinder arranged within the first-mentioned cylinder and having exhaust-ports in its periphery, a shaft journaled in the casing and cylinders, a turbine-wheel mounted upon the shaft within the second-mentioned cylinder, said turbine-wheel having a plurality of series of pockets in its periphery, the ribs forming the pockets being arranged in serpentine form across the periphery of the wheel whereby a series of alternating pockets are produced upon the opposite sides of the ribs, the faces of the ribs being concaved, valve-cylinders arranged within the steam-chamber and having inlet and exhaust ports, the exhaust-ports being in the opposite sides of the valve-cylinders, discharge-nozzles connected to the valve-cylinders and communicating with the exhaust-ports, and extending tangentially into the second-mentioned cylinder, the said nozzles upon one side of the valve-cylinders being arranged to discharge in one set of pockets, and the discharge-nozzles upon the opposite sides of the valve-cylinders being arranged to discharge in the opposite or alternating pockets of the turbine-wheel, reversing-valves for controlling the exhaust-ports, and means for operating all of the valves substantially as described.

14. In an engine of the kind described the combination with a casing, of a cylinder arranged therein, a second cylinder arranged within the first-mentioned cylinder, a shaft mounted in the first-mentioned cylinder and casing, a turbine-wheel mounted upon the shaft within the second-mentioned cylinder, said wheel having a plurality of series of alternating pockets arranged in its periphery, the sides of which are concaved, valve-cylinders arranged within the casing and having inlet and exhaust ports, the said exhaust-ports being upon both sides of the valve-cylinders, discharge-nozzles connected to the valve-cylinders and communicating with the discharge-ports, said nozzles extending in diverging directions and tangentially into the second cylinder, reversing-valves arranged within the valve-cylinders and controlling the exhaust-ports, one end of each valve extending through the head of the casing and having a crank-arm connected thereto, a disk mounted upon the head of the casing, said disk having a series of arms radiating therefrom, links connecting said arms and crank-arms, a lever connected to the said disk for controlling the movement thereof, cut-off valves arranged in the valve-cylinders and controlling the inlet-ports, said valves extending through the opposite head of the cylinder and having weighted crank-arms connected thereto, an eccentric mounted upon the shaft, an eccentric-strap operating thereon, rods connected to the said strap and links connecting said rods and crank-arms of the cut-off valves.

15. In an engine of the kind described, the combination with a casing, of a cylinder arranged therein, a second cylinder arranged within the first-mentioned cylinder, a shaft mounted in the casing and first-mentioned cylinder, a turbine-wheel mounted upon the shaft and having pockets in the periphery thereof, valve-cylinders arranged in the casing and having inlet and exhaust ports, discharge-nozzles extending from the exhaust-ports into the second-mentioned cylinder and adapted to discharge into the pockets of the turbine, cut-off valves operating in one end of the valve-cylinders, each valve having its outer end projecting through the head of the casing, weighted crank-arms connected to the said projecting ends, an eccentric and strap mounted upon the shaft, rods projecting from the strap, links connecting the rods and weighted crank-arms, reversing-valves operating in the said valve-cylinders, each valve having its outer end projecting through the head of the casing, crank-arms connected to the said ends, a disk mounted upon the head and having arms radiating therefrom, links connecting the arms of the disk and crank-arms, a lever connected to the disk, all substantially as and for the purpose specified.

16. In an engine of the kind described, the combination with the main and auxiliary casings, of cylinders arranged one within the other in each casing, to provide steam and exhaust chambers, a shaft mounted in the casings and cylinders, turbine-wheels mounted upon the shaft and operating in each inner cylinder, valve-cylinders arranged within the main casing and having inlet and exhaust ports, discharge-nozzles connected to the valve-cylinders and extending from the exhaust-ports into the inner cylinders, cut-off valves arranged in one end of each valve-cylinder and controlling the inlet-ports, reversing-valves arranged in the opposite end of each valve-cylinder and controlling the exhaust-ports, valve-tubes arranged in the auxiliary casing and having inlet and exhaust ports, reversing-valves arranged in the valve-tubes and controlling the exhaust-ports, means connected to the reversing-valves by which they are simultaneously operated, means connected to the said cut-off valves by which they are simultaneously operated, an inlet-pipe connected to the main casing, an exhaust-pipe connecting the exhaust-chamber in the main casing and the steam-chamber in the auxiliary casing and an exhaust-pipe connected to the exhaust-chamber of the auxiliary casing, all substantially as specified.

17. In an engine of the kind described, the combination with the main and auxiliary casings, each having steam and exhaust chambers, of the cylinders arranged one within the other in each casing, a turbine-wheel mounted in the inner cylinder of each casing, an inlet-pipe connected to the main casing, an exhaust-pipe connecting the exhaust-chamber in the main casing and the steam-chamber in the auxiliary casing, an exhaust-pipe connected to the exhaust-chamber in the auxiliary casing, valve-cylinders arranged in the main casing and having inlet and exhaust ports, discharge-nozzles connected to the valve-cylinders and extending into the inner cylinder, cut-off valves controlling the inlet-ports, reversing-valves controlling the exhaust-ports, valve-tubes arranged in the auxiliary casing and having inlet and exhaust ports, discharge-nozzles connected to the tubes and extending into the inner cylinder in the auxiliary casing, reversing-valves for controlling the exhaust-ports in the valve-cylinders and valve-tubes, cut-off valves controlling the inlet-ports in the valve-cylinders, means for simultaneously operating the reversing-valves, and means for operating the cut-off valves.

18. In an engine of the kind described, the combination with a main and auxiliary casing, each having steam and exhaust chambers, of the cylinders arranged one within the other in each casing, a shaft journaled within the casings and cylinders, an inlet-pipe connected to the main casing, an exhaust-pipe connecting the exhaust-chambers in the main casing and the steam-chamber in the auxiliary casing, and an exhaust-pipe connected to the exhaust-chamber in the auxiliary casing, turbine-wheels mounted upon the shaft and operating within the inner cylinders, valve-cylinders arranged within the main casing and having inlet and exhaust ports, discharge-nozzles extending from the exhaust-ports into the inner cylinder, cut-off valves controlling the inlet-ports, reversing-valves controlling the exhaust-ports, valve-tubes arranged in the auxiliary casing and having inlet and exhaust ports, discharge-nozzles extending from the said exhaust-ports into the cylinder of the auxiliary casing, reversing-valves controlling the exhaust-ports, and means for operating the said cut-off valves.

19. In an engine of the kind described, the combination with the main and auxiliary casings, each having steam and exhaust chambers, of cylinders within the casings, a second cylinder within each of the first-mentioned cylinders, a shaft journaled in the casings and cylinders, turbine-wheels mounted upon the shaft, an inlet-pipe connected to the main casing, a discharge-pipe connecting the exhaust-chamber of the main casing and the steam-chamber of the auxiliary casing, an exhaust-pipe connected to the exhaust-chamber in the auxiliary casing, valve-cylinders arranged within the main casing and having inlet and exhaust ports, discharge-nozzles extending from the exhaust-ports into the inner cylinder, cut-off valves and reversing-valves arranged within the valve-cylinders, valve-tubes arranged within the auxiliary casing and having inlet and exhaust ports, discharge-nozzles extending from the said exhaust-ports into the inner cylinder of the auxiliary casing, reversing-valves controlling the exhaust-ports, crank-arms connected to the reversing-valves, disks mounted upon the ends of the casings, each disk having arms radiating therefrom, links connecting the said arms of the disks and the said crank-arms, a rock-shaft journaled to the casings, crank-arms extending from each end of the shaft, a link connecting one disk and crank-arm and a second link connecting the second-mentioned disk and crank-arm, and a lever connected to one disk for operating the said disks, and reversing-valves and means for operating the cut-off valves.

20. In an engine of the kind described, the combination with a casing having cylinders arranged therein, and one within the other to provide steam and exhaust chambers, of a turbine operating within the inner cylinder, the said turbine having pockets in its periphery, the said inner cylinder having ports communicating with the pockets and exhaust-chamber, nozzles for feeding steam to the pockets, and valves for intermittently opening and closing the inlets to the nozzles.

21. In an engine of the kind described, the combination with a casing having an annular steam-chamber, of valve-cylinders arranged within the casing, and in the steam-chamber, said valve-cylinders having inlet and exhaust ports, rotary valves operating within the cylinders, for independently controlling the said ports, means for operating the valves, a turbine operating within the casing, and nozzles connected to the valve-cylinders for conducting steam from the exhaust-ports onto the periphery of the turbine-wheel.

22. In an engine of the kind described, the combination with a casing having an annular steam-chamber and an annular exhaust-chamber, of a turbine-wheel, valve-cylinders arranged in the casing and within the annular steam-chamber, said cylinders having inlet-ports arranged in the one end and exhaust-ports arranged upon opposite sides throughout the remaining portion of their length, nozzles connected to the exhaust-ports and arranged to discharge upon the turbine-wheel, rotary valves for controlling the inlet-ports, means for operating the valves to intermittently open and close the ports, rotary valves for controlling the exhaust-ports, and means for operating the last-mentioned valves.

CHARLES GEORGE ASHBY.
JOHN FRANKLIN MacINDOE.

Witnesses:
EDW. W. ANSTICE,
LOUIS GOODFRIEND.